US011702825B2

(12) United States Patent
Chauveau et al.

(10) Patent No.: US 11,702,825 B2
(45) Date of Patent: Jul. 18, 2023

(54) SINGLE LEVER, TIMED MIXER TAP

(71) Applicant: LES ROBINETS PRESTO, Montrouge (FR)

(72) Inventors: Stéphane Chauveau, Saint-Georges-de-Didonne (FR); Laurent Granseigne, Saint-Georges-de-Didonne (FR); Grégory Bacquet, Saint-Georges-de-Didonne (FR)

(73) Assignee: Les Robinets Presto, Montrouge (FR)

( * ) Notice: Subject to any disclaimer, the term of this patent is extended or adjusted under 35 U.S.C. 154(b) by 315 days.

(21) Appl. No.: 16/650,461

(22) PCT Filed: Sep. 21, 2018

(86) PCT No.: PCT/EP2018/075663
§ 371 (c)(1),
(2) Date: Mar. 25, 2020

(87) PCT Pub. No.: WO2019/063439
PCT Pub. Date: Apr. 4, 2019

(65) Prior Publication Data
US 2020/0308812 A1   Oct. 1, 2020

(30) Foreign Application Priority Data
Sep. 28, 2017   (FR) ..................... 17 71031

(51) Int. Cl.
*E03C 1/04* (2006.01)
*F16K 11/00* (2006.01)
*F16K 21/10* (2006.01)

(52) U.S. Cl.
CPC ............ *E03C 1/041* (2013.01); *F16K 19/006* (2013.01); *F16K 21/10* (2013.01); *E03C 2001/0415* (2013.01); *E03C 2201/30* (2013.01)

(58) Field of Classification Search
CPC .......... E03C 1/04; E03C 1/041; E03C 1/0412; F16K 21/10
See application file for complete search history.

(56) References Cited

U.S. PATENT DOCUMENTS 2,324,946 A * 7/1943 Molloy ................... F16K 21/10
251/50
2,988,110 A * 6/1961 Thomas ................... F16K 19/00
137/636.4
(Continued)

FOREIGN PATENT DOCUMENTS

DE   296 08 014 U1   10/1996   ............. F16K 21/06
DE   299 15 433 U1    1/2000   ............. F16K 11/00
(Continued)

OTHER PUBLICATIONS

International Search Report dated Jan. 15, 2019 in related application No. PCT/EP2018/075663.

*Primary Examiner* — Reinaldo Sanchez-Medina
(74) *Attorney, Agent, or Firm* — Renner Kenner Greive Bobak Taylor & Weber

(57) ABSTRACT

The invention relates to a single-lever, timed mixer tap comprising a push-button that makes it possible to control the passage of water between at least one water-supply inlet, in particular two inlets for hot water and cold water, respectively, and at least one outlet for the mixed water, a mixing block having a portion that is rotatably movable in relation to a stationary portion in order to vary the temperature of the mixed water, and a timer cartridge, characterised in that the mixing block and the timer cartridge are mounted separately from one another and the push-button is mounted translatably and rotatably movable, and in that at least one member for transmitting the movement of the push-button is provided, which is designed to transmit a translational movement to an actuator rod of the timer cartridge as well as a
(Continued)

rotational movement to the movable portion of the mixing block.

9 Claims, 5 Drawing Sheets

(56) References Cited

U.S. PATENT DOCUMENTS

| | | | | | |
|---|---|---|---|---|---|
| 4,241,759 | A | * | 12/1980 | Billeter | F16K 11/0746 251/38 |
| 4,285,361 | A | * | 8/1981 | Lissau | F16K 11/085 251/44 |
| 4,457,452 | A | * | 7/1984 | Symmons | F16K 11/0746 137/636.4 |
| 4,471,939 | A | * | 9/1984 | Scragg | A01G 25/165 251/38 |
| 4,784,368 | A | * | 11/1988 | Koch | F16K 21/10 251/285 |
| 5,295,654 | A | * | 3/1994 | Laube | F16K 21/06 251/35 |
| 5,427,351 | A | * | 6/1995 | Korfgen | F16K 21/10 251/35 |
| 2009/0044865 | A1 | * | 2/2009 | Migliore | F16K 11/0856 137/1 |

FOREIGN PATENT DOCUMENTS

| | | | | |
|---|---|---|---|---|
| EP | 2 998 622 A1 | 3/2016 | | F16K 11/065 |
| WO | WO 2015/043080 A1 | 4/2015 | | F16K 21/04 |

\* cited by examiner

SINGLE LEVER, TIMED MIXER TAP

CROSS-REFERENCE TO RELATED APPLICATION

This is a § 371 application of International patent application number PCT/EP2018/075663 filed Sep. 21, 2018, and French application FR 17 71031 filed Sep. 28, 2017.

TECHNICAL FIELD

The invention relates to a single-lever, timed mixer tap.

BACKGROUND ART

A timed mixer tap traditionally comprises a pushbutton that makes it possible to control the passage of water between at least one water supply inlet, in particular two inlets for hot water and cold water respectively, and at least one outlet for the mixed water. A mixing block having a portion that is rotatably movable in relation to a stationary portion, for example a tap body, is arranged between the inlet or inlets and the outlet, said rotation making it possible to vary the respective hot water and cold water inlet sections, and a timer cartridge, for example a so-called membrane timer cartridge.

Timed mixer taps of the prior art are bulky and have a complex structure due to their dual functionality and the present invention seeks to overcome these disadvantages by proposing a more compact tap of this type with a simpler structure.

SUMMARY OF THE INVENTION

According to the invention, the single-lever, timed mixer tap comprising a pushbutton that makes it possible to control the passage of water between at least one water supply inlet, in particular two inlets for hot water and cold water respectively, and at least one outlet for the mixed water, a mixing block having a portion that is rotatably movable in relation to a stationary portion in order to vary the temperature of the mixed water, and a timer cartridge, characterised in that the mixing block and the timer cartridge are mounted separately from one another and the pushbutton is mounted such that it is translatably and rotatably movable, and in that at least one member for transmitting the movement of the pushbutton is provided, this being designed to transmit a translational movement to an actuator rod of the timer cartridge as well as a rotational movement to the movable portion of the mixing block.

In thus providing this dual movement and this double transmission in translation and rotation of the pushbutton in relation to the actuator rod of the timer cartridge and the mixing block respectively, these being arranged one after the other, it is possible to obtain a particularly functional timed mixer tap, and in particular, a single-lever, timed mixer tap, with the ability to control the temperature and the flow by means of the single pushbutton.

In addition, transmission of the translational movement to the mixing block is prevented, this transmission being absorbed by the timer cartridge, which leads to a more compact system and the option, if desired, to add means for controlling temperature stops at the top of the product and/or permitting access to the timer control.

The timer cartridge is preferably arranged between the pushbutton and the mixing block to obtain a particularly compact tap.

According to a preferred embodiment of the invention, the timer cartridge is received at least in part, and particularly substantially completely, inside the transmission member.

In particular, the transmission member is a hollow cylinder, especially traversed by the actuator rod of the timer cartridge.

According to a preferred embodiment of the invention, the mixing block, timer cartridge, pushbutton and transmission member, especially in the form of a hollow cylinder, are aligned, especially along the axis of the actuator rod.

According to a preferred embodiment of the invention, the mixing block is a so-called thermostatic sub-assembly.

According to the invention, the fact that the mixing block and the timer cartridge are mounted separately from one another means that, if one or other of the two elements, specifically the timer cartridge, is removed, the other element, specifically the mixing block, continues to operate.

Thus, for example, in EP 2 998 622, the mixing block 56, 57 and the timer cartridge 40 are not mounted separately from one another, since, if the actuator rod 12 is removed from the timer cartridge, there is nothing left to actuate the mixing block 56, 57.

Similarly, in DE 299 15 433, the mixing block 18 and the timer cartridge 14 are not mounted separately from one another. If the cartridge 14 is removed, there is no longer any connection between the pushbutton 89 and the mixing block and the latter is no longer able to operate.

BRIEF DESCRIPTION OF THE DRAWINGS

By way of example, a preferred embodiment of the invention will now be described with reference to the drawings in which:

FIGS. 1 and 2 show two embodiments of a timed mixer tap according to the invention. In FIG. 1, the mixing block consists of a so-called thermostatic element, whereas in FIG. 2, the mixing block consists of a so-called ceramic plate element, or sliding contact block.

DETAILED DESCRIPTION OF THE INVENTION

Figure 1:
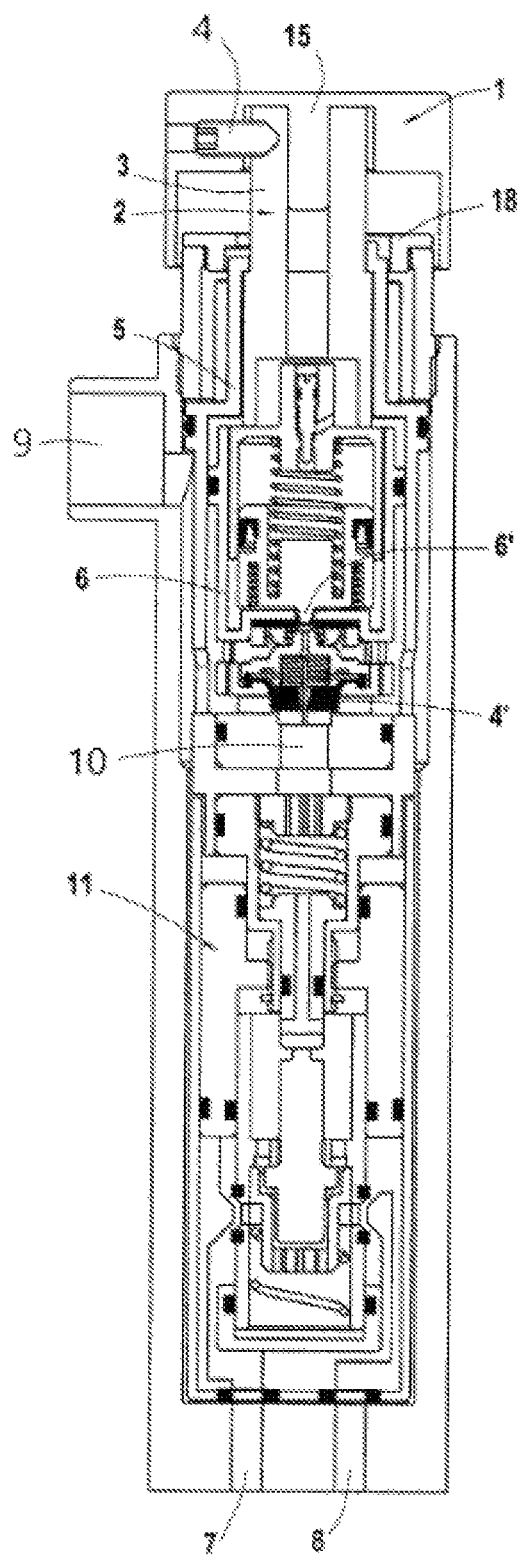
FIG. 1 is a view in longitudinal section of a timed mixer tap according to the invention comprising a so-called thermostatic mixing block.

Apart from this difference relating to the type of mixing block, both embodiments are similar and the common portions and parts of both embodiments have the same reference numerals.

The timed mixer taps shown in the figures comprise an upper portion consisting of a pushbutton 1. This pushbutton 1, which is substantially circular-cylindrical in shape, works together with a transmission element 2 with an upper portion 3 in the form of a rod forming part of the pushbutton by means of a locking screw 4 and a lower portion 5 in the form of a hollow cylinder defining an internal space designed to enable the cylinder to cover a timer cartridge 6.

The timer cartridge 6 is shown in operation particularly in FIGS. 3A to 3D. However, it should be noted that any other type of timer cartridge could be used.

Figure 2:
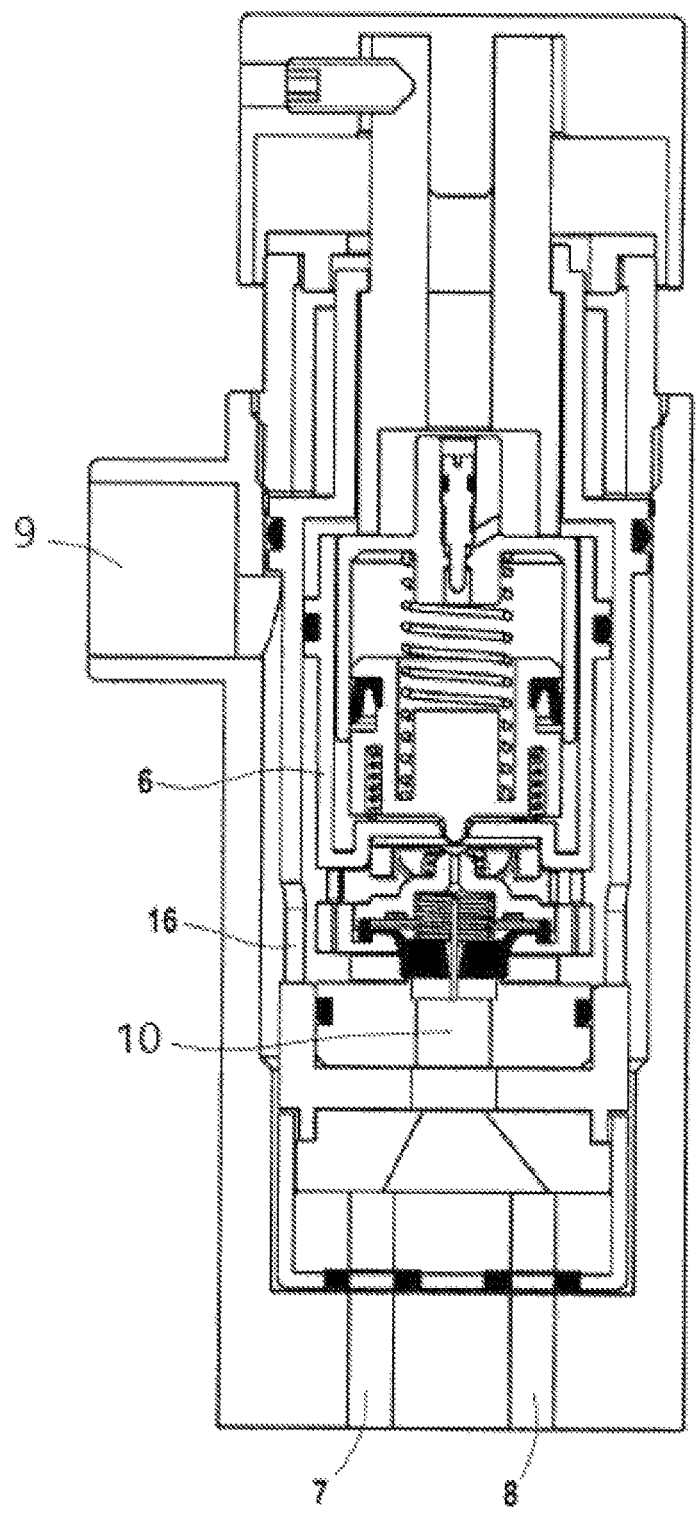
FIG. 2 is a view in longitudinal section of another embodiment of a timed mixer tap according to the invention comprising a so-called ceramic disc mixing block.

The timer cartridge 6 is arranged between the pushbutton and the thermostatic mixing block 11 in FIG. 1, or the mixing block 11' with a ceramic disc in FIG. 2.

The timer cartridge 6 and the mixing block 11, or 11' respectively, are mounted separately from one another, and particularly such that they can be disconnected, for example, by removing the mixing block without causing the tap to stop working, although certainly without any mixing function. The two elements (cartridge 6 and block 11 or 11') are not interlocked in one another and operate independently of one another.

The tap comprises two water inlets 7 and 8 for cold water and hot water respectively. After cold water and hot water from the inlets 7 and 8 passes into the mixing block 11, or 11' respectively, the mixed water is delivered at the outlet 10 of the mixing block towards the outlet 9. When the main closure member 4' of the timer cartridge is in its seat, water is prevented from leaving the outlet 10 towards the outlet 9. When the user presses on the upper surface 15 of the pushbutton 1, this causes a translational movement of the rod 3, which is itself integral with the actuating plunger 6' of the timer cartridge, which causes the seat in which the main closure member 4' is located to open once the user has released the pressure on the button 1, allowing the mixed water to be delivered via the mixed water outlet 9.

The button 1 is also mounted rotatably along an axis running parallel to its direction of translational movement and is connected to the cylinder 5 so as to cause it to rotate. Said cylinder is in turn connected to the movable portion of the mixing block such as, in the case of the embodiment shown in FIG. 2, to adjust the relative cross-sections of the inlets 7 and 8 for hot water and cold water respectively and thus adjust the temperature of the mixed water leaving the outlet 9, and in the case of the embodiment shown in FIG. 1, to adjust the mixing block 11' element affecting temperature. This thus provides a thermostatic, single-lever, timed mixer tap.

The lower edge of the cylinder 5 is indented such as to comprise alternating slots 16 and projections 17, said projections ensuring that the cylinder is rotationally connected with the movable section of the mixing block while still allowing the mixed water exiting via the outlet 10 of the mixing block to flow towards the outlet 9 of the tap.

On the other hand, a ring 18 limits the rotation of the button 1 and thus the cylinder 5 to maintain this rotation within a range corresponding to a mixed water temperature range which is acceptable for normal use, without any risk for the user.

FIGS. 3A to 3D show the different operating stages of the timer cartridge.

The timer cartridge 6 shown comprises a main body 60 which is substantially circular-cylindrical. The main body 60 comprises a water inlet or supply opening 2' at its lower end, radial outlet openings 3' also being arranged on the lower portion of the body. A main closure member 4' in the form of a membrane comprising a lock wire 5' is received in a seat formed in the opening 2'.

A first substantially circular-cylindrical or tubular upper block 61 is received in the upper portion of the main body 60, an upper tubular element 62 being arranged in said block, said upper element being open at the bottom and able to slide in the vertical direction inside the first block 61, and a lower tubular element 63 also being arranged in said block, said lower element being able to slide in the upper tubular element 62 along its lower wall so as to define a timer chamber 64 between the two elements with a volume that varies as a function of the relative sliding of the two elements 62 and 63. A flap in the form of a lip seal 65 arranged between the two elements and forming an integral part of the lower element 63 ensures that the chamber 64 is leaktight when it is full and allows it to be drained when the air is pushed downwards.

A push element 67 extends from the upper wall of the upper element 62, passing through the upper wall of the block 60 and protruding outside the main body.

An upper spring 66 rests between the upper wall of the element 62 and the bottom wall of the lower element 63. When the chamber 64 is at its maximum volume (FIG. 3A), the spring is in the uncompressed or resting state.

A lower spring 68 rests between the bottom wall of the lower element 63 and the bottom wall of the block 61. When the chamber 64 is at its maximum volume (FIG. 3A), the spring is in the compressed state.

A plunger 6' extends from the bottom wall of the lower tubular element 63 and passes through the bottom wall of the block 61. A membrane 27', particularly made from an impermeable elastomer material, is arranged opposite the hole through which the plunger 6' passes in the bottom wall of the block 61, and is pressed against the lower face of the block 61. It could, although this is not essential, be fixed, for example by welding, gluing or similar means, along its peripheral edge to the lower face of the block 61. When the plunger 6' is pushed out of the block 61, it comes up against the membrane 27' and displaces the central portion of the bottom wall of the block 61.

A lower block 70 with a substantially cylindrical shape, defining the supply fluid inlets and outlets and the main seat of the closing member 4', is also arranged in the main body 60 of the cartridge.

An internal space 50 in which an annular element 51 is received is formed between the two upper and lower blocks, said space comprising a vertical central channel 54 passing through from one end to the other. The internal space 50 is divided, by interposing the annular element 51, into two sub-spaces, an upper and a lower sub-space respectively, which communicate via the central channel 54 to allow fluids through. The upper outlet of the vertical channel 54 is opposite the central portion of the membrane 27' and the plunger 6'.

Figure 3A:
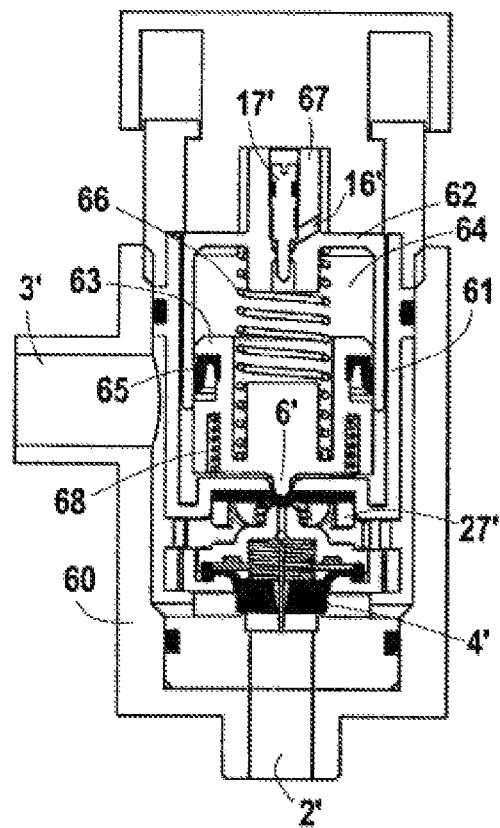
FIGS. 3A to 3D show the element forming the timer cartridge used in the embodiments shown in FIGS. 1 and 2.

The cartridge in FIGS. 3A to 3D operates as follows:

In the position shown in FIG. 3A, the main closure member or membrane 4' is in its seat and prevents the supply fluid passing through from the inlet opening to the side outlet openings. The timer chamber 64 is filled with timer fluid (air in this case) such that the plunger 6' is kept at the bottom and presses the membrane 27' against the edge of the upper opening of the channel 54, thus preventing the supply fluid present in the lower sub-space from passing into the upper sub-space of the space 50 despite the pressure of the fluid at the inlet 2'. The lower sub-space is completely filled with supply fluid via the lock wire 5', the pressure of the fluid pressing the membrane 4' into its seat. The push element 67 is not pressed downwards and protrudes outside the main body 60 and the block 61. The force of the spring 66 contained in the main timer chamber 64 is higher than the force exerted by the compressed spring 68.

Figure 3B:
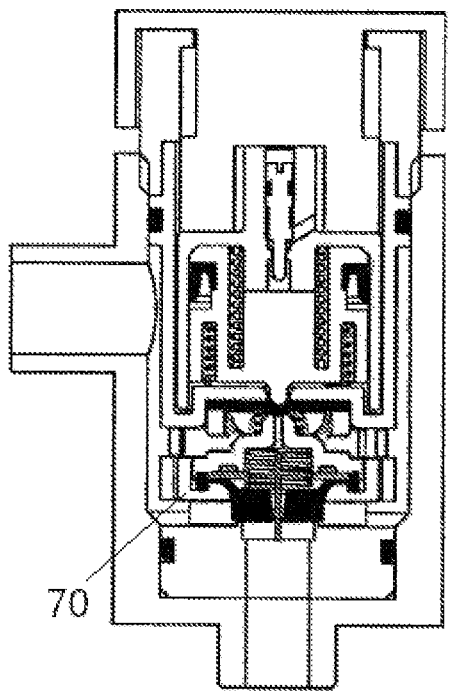

In FIG. 3B, the user presses the push element 67. The air contained in the timer chamber 64 is driven downwards to the level of the lower peripheral extremity of the lip seal 65, then returned upwards along the side walls between the walls of the upper block 61 and the wall of the tubular element 62 before emerging through the upper opening in the block 61. The timer chamber 64, which is initially filled with air, is now empty and the upper spring 66 is compressed due to the user's pushing action. The plunger 6' continues to press on the membrane 27'. Thus, as long as the user keeps the pressure on the push element 67, the tap remains closed, since it can only be opened to allow the supply fluid to pass through once the pressure on the element 67 has been released.

Figure 3C:
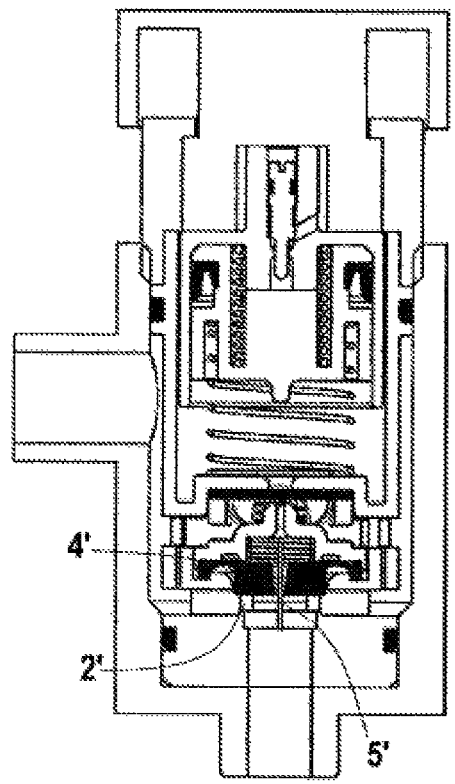

In FIG. 3C, the user has released the pressure on the push element 67. Since the compressed lower spring 68 is no longer opposed by the force of the spring 66 (which remains compressed due to the low pressure in the timer chamber) in the chamber 64 to be supported, this causes the two upper and lower tubular elements 62 and 63 to rise and, as a result, causes the plunger 6' to rise and thus cease to be in contact with the membrane 27'. This results in a rise in the central portion of the membrane 27' and causes the channel 54 to open at the top. The supply fluid, which was previously blocked at the outlet from the channel 54, can pass into the upper sub-space and exit via the side outlets in this sub-space. This leads to a reduction in the pressure exerted by the water in the lower sub-space on the main membrane 4', which rises under the effect of the water entering via the inlet 2' and allows the supply fluid (water) to pass through towards the side outlets 3'. At the same time, the upper spring 66 has been compressed and the chamber 64 remains empty. However, air starts to enter again at the top via the appropriate flap orifices 16' formed in the push element 67, said orifices having a cross-section that can be adjusted by an adjustment rod 17'.

As the air or timer fluid fills the chamber 64 again, the lower tubular element 63, under the effects of air pressure and the compressed upper spring 66, falls again, taking with it the plunger 6' (FIG. 3D) until said plunger presses the membrane 27' against the edge of the outlet from the channel 54, which has the effect of increasing the pressure in the upper portion of the main membrane and thus again pressing the main membrane 4' back into its seat to block the passage of water between the inlet 2' and the outlets 3' (FIG. 3A).

Figure 3D:
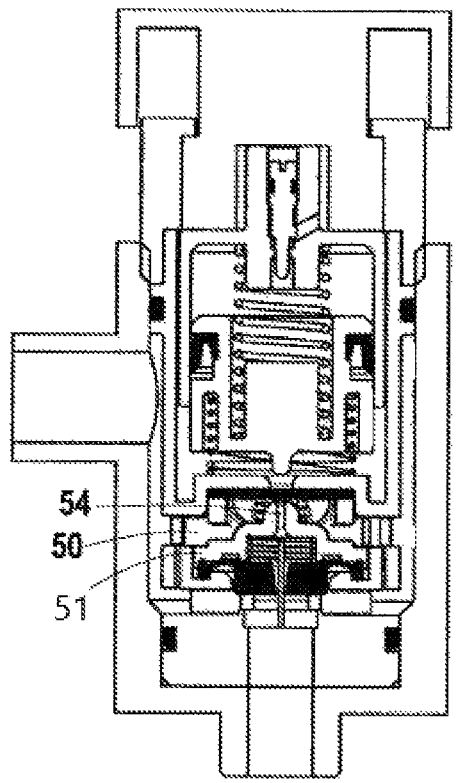
Figure 4:
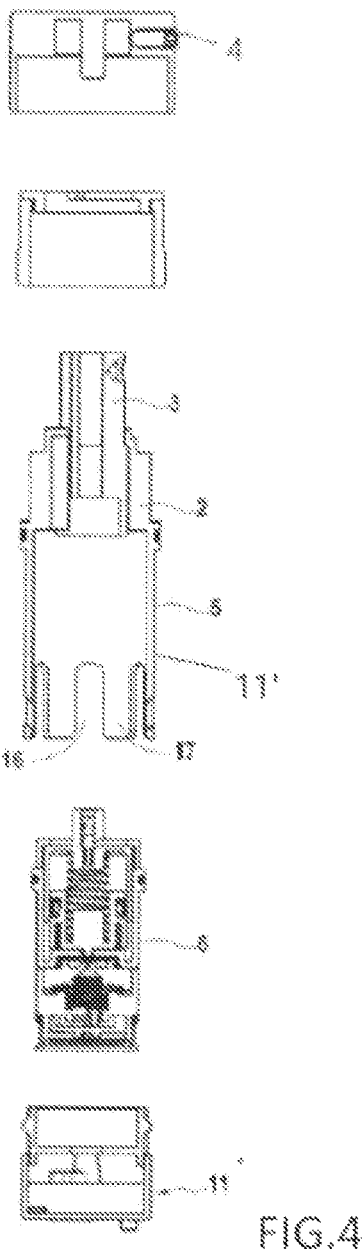
FIG. 4 is an exploded view of the embodiment shown in FIG. 2.

In FIGS. 3C and 3D, it is possible to see that the supply fluid (water) exits towards the top, after being merged with water exiting from the upper sub-space.

In accordance with the described embodiments of the invention, even if the timer cartridge is removed, the mixing block continues to be controlled by the pushbutton from outside.

The invention claimed is:

1. A single-lever, timed mixer tap comprising a pushbutton that makes it possible to control the passage of water between two inlets for hot and cold water respectively and at least one outlet for mixed water, a mixing block having a portion that is rotatably movable in relation to a stationary portion in order to vary the temperature of the mixed water, and a timer cartridge, characterized in that the mixing block and the timer cartridge are mounted separately from one another, are not interlocked in one another, and operate independently of one another, and the pushbutton is mounted such that it is translatably and rotatably movable, and in that a transmitting member for transmitting movement of the pushbutton is provided, said transmitting member being designed to transmit a translational movement to an actuator rod of the timer cartridge as well as a rotational movement to the portion that is rotatably moveable of the mixing block.

2. The single-lever, timed mixer tap according to claim 1, characterized in that the rotational movement is transmitted from the exterior of the timer cartridge.

3. The single-lever, timed mixer tap according to claim 1, characterized in that the mixing block is a thermostatic sub-assembly.

4. The single-lever, timed mixer tap according to claim 1, characterized in that the timer cartridge is arranged between the pushbutton and the mixing block.

5. The single-lever, timed mixer tap according to claim 1, characterized in that the timer cartridge is received in part inside a transmission member.

6. The single-lever, timed mixer tap according to claim 5, characterized in that the transmission member is a hollow cylinder traversed by the actuator rod of the timer cartridge.

7. The single-lever, timed mixer tap according to claim 6, characterized in that the mixing block, the timer cartridge, the pushbutton and the transmission member.

8. The single-lever, timed mixer tap according to claim 7, characterized in that the mixing block, the timer cartridge, the pushbutton, and the transmission member are aligned along an axis of the actuator rod.

9. The single-lever, timed mixer tap according to claim 5, wherein the entirety of the timer cartridge is received inside the transmission member.

* * * * *